(No Model.) 3 Sheets—Sheet 1.

E. R. ESMOND.
CAR TRUCK.

No. 465,658. Patented Dec. 22, 1891.

Witnesses:
Raphael Netter
Robt. F. Gaylord

Inventor
E Richard Esmond
by Duncan & Page
Attorneys (No Model.) 3 Sheets—Sheet 2.

E. R. ESMOND.
CAR TRUCK.

No. 465,658. Patented Dec. 22, 1891.

Witnesses:
Raphaël Netter
Robt. F. Gaylord

Inventor
E. Richard Esmond
by Duncan & Page
Attorneys.

(No Model.)  3 Sheets—Sheet 3.

E. R. ESMOND.
CAR TRUCK.

No. 465,658.  Patented Dec. 22, 1891.

Witnesses:
Raphaël Netter
Robt. F. Gaylord

Inventor
E. Richard Esmond
By Duncan & Page
Attorneys.

UNITED STATES PATENT OFFICE.

ERNEST RICHARD ESMOND, OF NEW YORK, N. Y.

CAR-TRUCK.

SPECIFICATION forming part of Letters Patent No. 465,658, dated December 22, 1891.

Application filed April 28, 1891. Serial No. 390,743. (No model.)

*To all whom it may concern:*

Be it known that I, ERNEST RICHARD ESMOND, of the city, county, and State of New York, have invented certain new and useful Improvements in Single-Driving-Axle Car-Trucks, of which the following is a description, reference being had to the accompanying drawings.

The present invention relates, generally, to that class of car, locomotive, or other trucks in which a single pair of wheels is centrally located under or relative to the truck and carries the load, or the greater portion thereof, and serves, when the motive power is applied to the truck, as the main driving or carrying wheels and main driving or carrying axle.

The invention relates, particularly, to such trucks of this class as are provided with a pair of wheels located in advance of the main or driving wheels and another pair of wheels located at the rear of the main wheels, the forward and rearward axles and their wheels usually being known as "pony-trucks," and single-driving-axle trucks thus provided with pony-trucks being known as "balance-trucks." As is well understood, the load, when the truck is moving on a straight line, is balanced over and carried on the main or central wheels, and the pony-trucks have for their essential function to switch, turn, and otherwise direct or guide the main truck or main driving axle and wheels.

The invention has for its leading object to adapt to balanced trucks the principle of link and link-housing connections between the truck and its power-axles, (shown and described in my United States Letters Patents, No. 238,280, of March 1, 1881, and No. 247,814, of October 4, 1881,) together with certain other features of improvement not embodied in the invention of said patents.

The invention consists, first, of a truck in which the truck frame is carried on or balanced on a centrally-arranged pair of main driving or carrying wheels, and is provided with extensions reaching longitudinally each way from said wheels, at the ends of which extensions are pony-axles connected thereto by links and link-housings, all as hereinafter more fully set forth and claimed.

Figure 1:
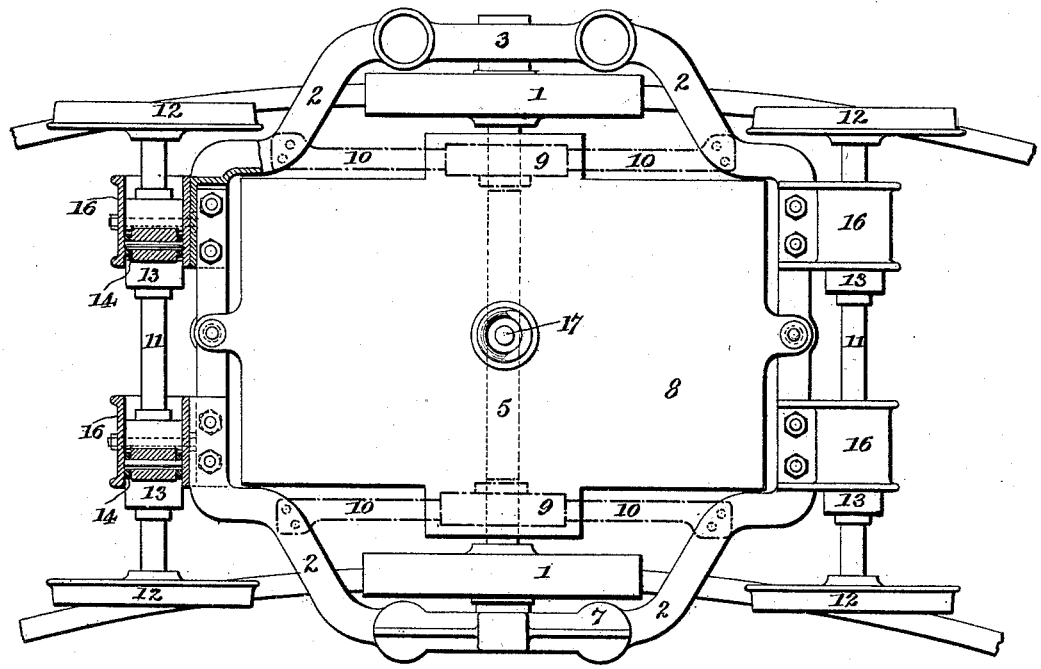
Figure 2:
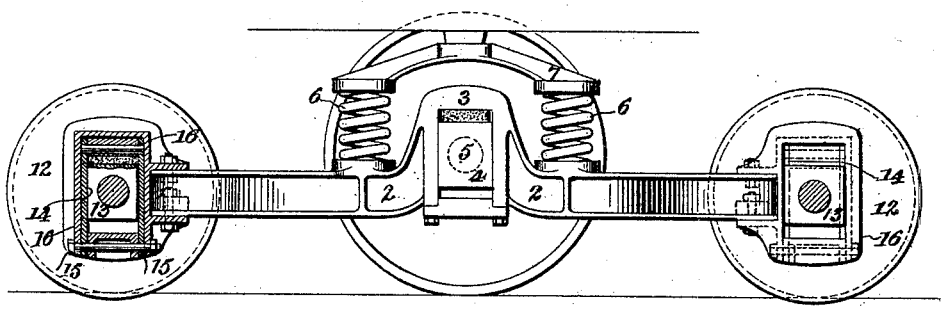
Figure 3:
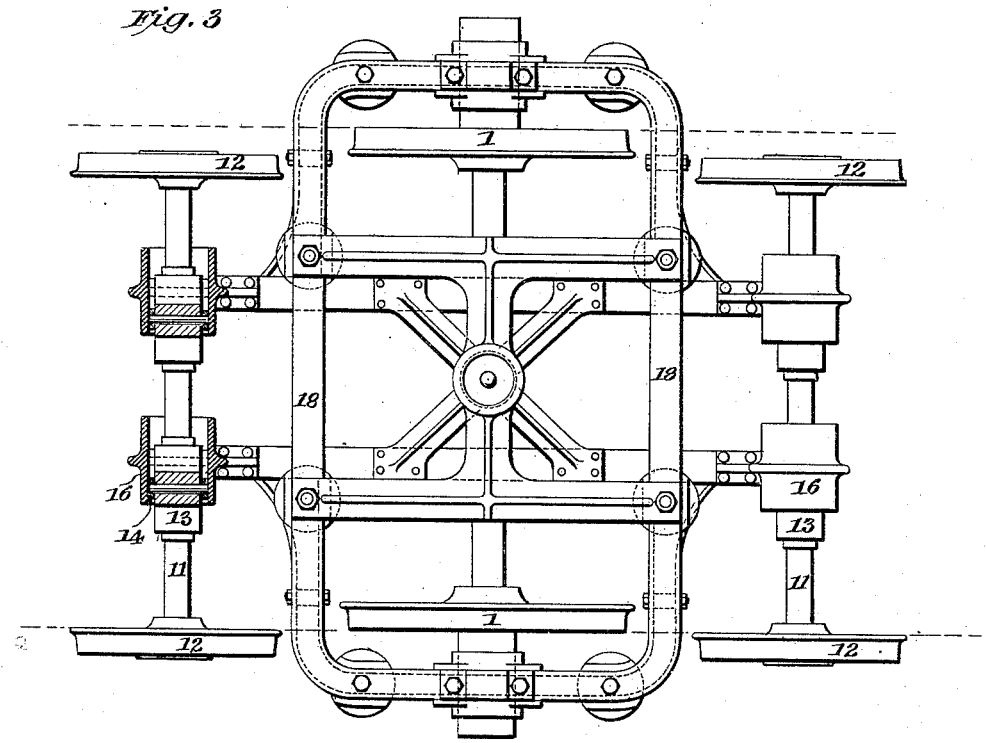
Figure 4:
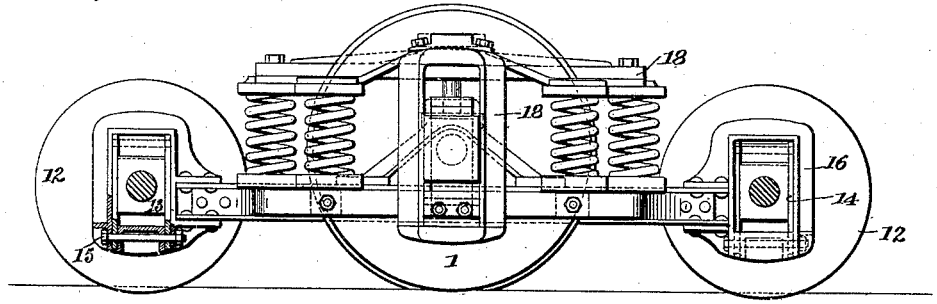
Figure 5:
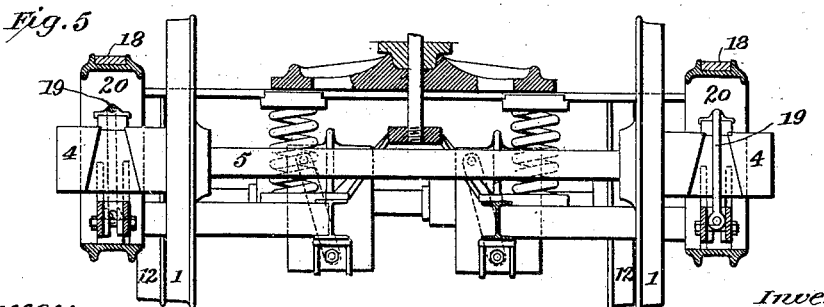
Figure 6:
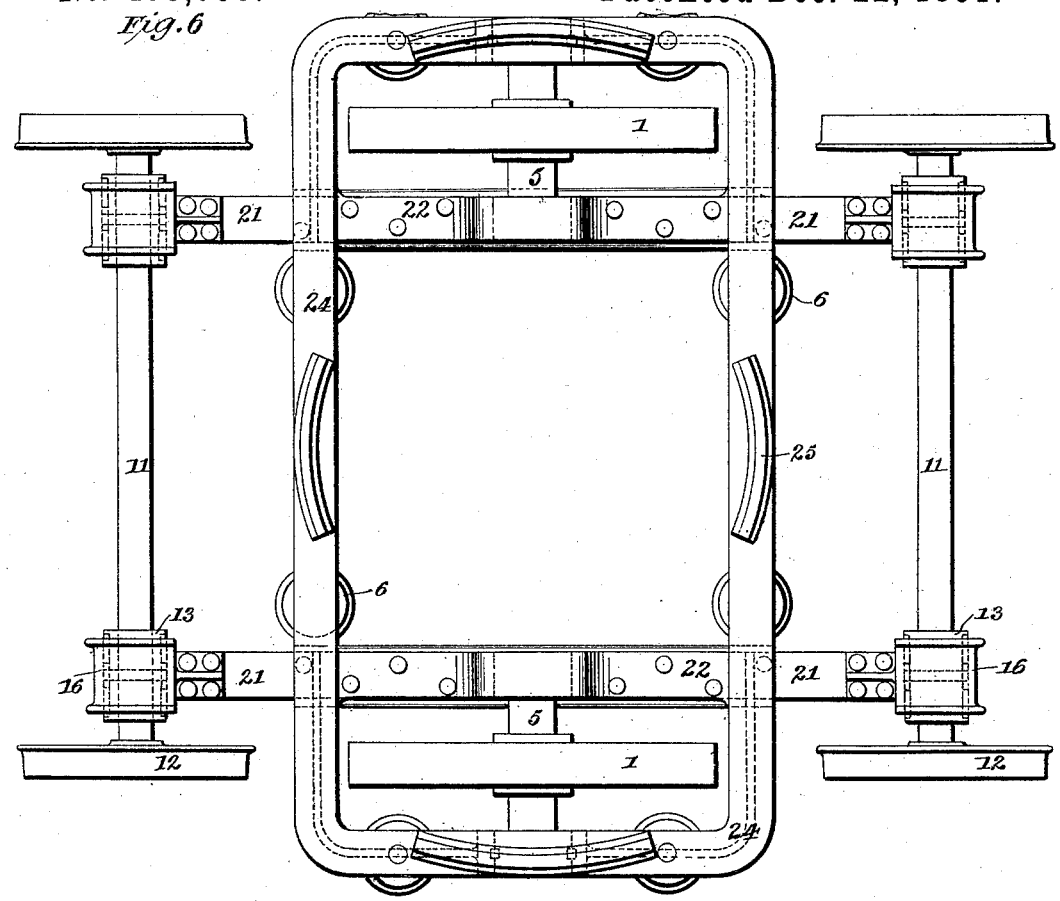
Figure 7:
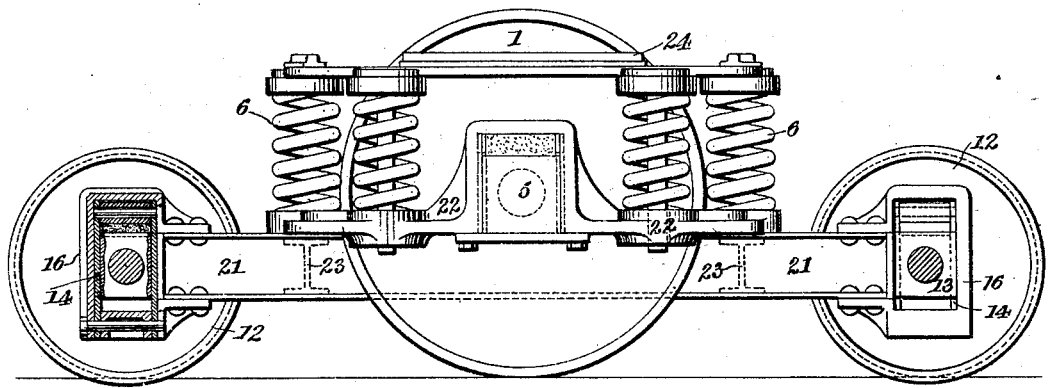

Figure 1 is a general plan view of a truck embodying my improvements, the construction here shown being particularly adapted to carry an electric motor and the truck being shown on a track having an exaggerated curve. Fig. 2 is a side elevation of the same. Fig. 3 is a plan view of a truck of heavier construction than shown in Figs. 1 and 2 and particularly adapted for heavy car or locomotive work, and the truck being shown as on a track having an exaggerated curve. Fig. 4 is a side elevation of the same. Fig. 5 is a cross-section along the central or main driving or carrying axle. Fig. 6 is a plan view of a truck adapted to carry a cable-grip. Fig. 7 is a side elevation of the same.

Referring to the views in detail, 1 represents the main wheels, which are located midway between the ends or end extensions of the truck-frame.

2 is the side of the truck-frame. This consists in this case of any suitable angle-iron, bar, or other structure having housings 3 on each side thereof for the boxes 4 of the journals of the main axle 5. On this frame are arranged suitable cushioning devices, as the springs 6, upon the tops of which rest the spring-caps 7, the top faces of which form rubbing-surfaces for the car which rests upon them. This frame extends forward and rearward from the main wheels 1 to a suitable distance to form a space between the main wheels and forward and backward of the same, in which may be hung an electric motor 8, properly hung over or in other operative relation to the wheels 1. For electrical work the wheels 1 may be on the same axle, as indicated by the dotted lines 5.

If it be desired to employ this form of truck for carrying a cable-grip, then the space occupied by the motor may have a grip or grip-frame hung in it. In this case the wheels 1 would still be on the same axial line, but have separate short axles, the housings of which at their inner ends are carried on the cross-pieces 10, as indicated by broken and dotted lines in Fig. 1. The parts of the frame 2 that extend forward of and rearwardly from the main wheels also constitute extensions to which the pony-axles 11 and wheels 12 are connected. 13 represents axle-boxes on these axles that move longitudinally with the axles and in which the axles rotate. To the tops of these boxes links 14 are pivotally attached, and these links are also pivotally attached at 15 to the bottoms of the housings 16, carried on the extensions of the truck-frame, the housings inclosing the boxes and links, so that the pony-axles are rigid longitudinally with the truck-extensions, but free to move laterally thereto. In Figs. 1 and 2 the king-pin 17 for the car is shown as borne on the frame-work of the motor.

In Figs. 3, 4, and 5 I show a form of truck adapted to heavy cars and to locomotives, and the figures of reference of Figs. 1 and 2 apply here, except that the spring-caps 7 of Figs. 1 and 2 are here substituted by one large and powerful frame 18, combining more extensively the functions of rubbing and bearing surfaces. Also, in this case, Figs. 3 to 5, the driving or main axle is shown as having link and link-housing connections with the truck-frame by links 19 and housing 20, whereby the truck-frame as a whole operates as do, and takes the place of, the common and well-known swinging bolsters.

In Figs. 6 and 7 I show a balanced truck-frame particularly constructed to carry a cable-grip. The figures of reference apply as before, except here the main driving or carrying wheels are journaled between the side bars 21 and the bracket-pedestal frames 22, carried on the said bars 21 and connected by cross-bars 23. So, also, the spring-cap plate 24 is one continuous frame or piece surrounding the open central space in which the grip is to be hung, and carries the eccentrically-arranged male rubbing-tracks 25 for the car-body, and which enter the corresponding reverse parts on the car-body. By this arrangement no king-pin is necessary. It is of course to be understood that the grip or grip-frame may hang from the truck or from the car, in the latter case preferably on or about the axis of the rubbing-tracks.

In all these structures it is preferred to connect the pony axles and wheels to the truck-extensions so that, with the car resting normally upon or over the central or main wheels, it is insured that the whole weight of the load will be sustained by the said main wheels, as the advantages of the improvements are thereby most fully realized; but this is not a requirement, for if the pony-wheels do sustain a part of the load their peculiar action and effect are in proportion to the amount of their load, being less than that on the main wheels.

It will now be plain how these structures operate. As either of the sets of pony-wheels meet any slight lateral obstruction in the track they are free to move laterally in their housings without transmitting shock or jar to the car. The motion of one axle may be sufficient to through its links sway the truck-frame around its central connection with the car; but even then shock is not transmitted to the car, for the opposite end of the frame is free to move laterally relatively to and on its pony-axle. It is also to be specially noted that when the tendency to lateral motion of the forward axle is continued, as when going around a curve, the endwise motion of the axle tends to gradually lift vertically the link-housings harder and harder against the load, so that the lateral resistance the pony-axles meet is opposed to the vertical or gravity resistance of the load. Further, it will be noted that all these actions are elastic and spring-like in effect, though brought about by positively-acting parts, and the rate of speed or weight of load are met by proportionate resistances developed gradually and regularly. This results in the driving-axle being practically freed of any lateral pressure, depending, of course, in part upon the length of the longitudinal frame-extensions and in this axle being always kept radial to a curve it is traversing without the slip and grinding so detrimental in common forms of trucks.

What I claim as my invention is—

1. The combination, in a truck, of a pair of main driving or carrying wheels, an extension-frame extending forwardly and rearwardly from said wheels, and pony-wheels connected to the ends of said frame by vertical links.

2. The combination, in a truck, of a pair of main driving or carrying wheels, an extension-frame extending forwardly and rearwardly from said wheels, pony-wheel axle attached by vertical links to the ends of the frame, and housings between the end axles and said frame, permitting the relative lateral motion of the frame and axles, but holding them rigidly together longitudinally.

3. The combination, in a truck, of a pair of main driving or carrying wheels, an extension-frame extending forwardly and rearwardly from said wheels, pony-wheels connected to the ends of said frame by vertical links, and housings to said links, whereby the links have lateral but not longitudinal motion relative to their housings.

4. The combination, in a truck, of a pair of main driving or carrying wheels, an open frame adapted to carry a motor or cable-grip, and a frame extending forwardly and rearwardly from said wheels and connected at its ends to axles by link and link-housings.

5. The combination, in a truck, of a pair of main driving or carrying wheels, a truck-frame on said wheels adapted to carry the car or load, and a frame extending longitudinally from said wheels and connected at its end to a pair of wheels by means of link and link-housings, as and for the purpose set forth.

E. RICHARD ESMOND.

Witnesses:
ROBT. F. GAYLORD,
FRANK B. MURPHY.